(12) United States Patent
McCarthy et al.

(10) Patent No.: US 9,503,173 B2
(45) Date of Patent: Nov. 22, 2016

(54) WLAN AND CELLULAR SHARED ANTENNAS

(71) Applicant: BROADCOM CORPORATION, Irvine, CA (US)

(72) Inventors: Evan Scott McCarthy, Irvine, CA (US); John Stuart Walley, Ladera Ranch, CA (US); Ling Su, Los Altos Hills, CA (US); Djordje Tujkovic, Mountain View, CA (US); Joseph Saada, Haifa (IL); Kameswara Rao Medapalli, San Jose, CA (US)

(73) Assignee: BROADCOM CORPORATION, Irvine, CA (US)

( * ) Notice: Subject to any disclaimer, the term of this patent is extended or adjusted under 35 U.S.C. 154(b) by 141 days.

(21) Appl. No.: 14/012,353

(22) Filed: Aug. 28, 2013

(65) Prior Publication Data

US 2015/0036656 A1 Feb. 5, 2015

Related U.S. Application Data

(60) Provisional application No. 61/860,635, filed on Jul. 31, 2013.

(51) Int. Cl.
*H04W 84/12* (2009.01)
*H04B 7/06* (2006.01)
*H04B 7/08* (2006.01)

(52) U.S. Cl.
CPC .......... *H04B 7/0871* (2013.01); *H04B 7/0689* (2013.01); *H04W 84/12* (2013.01)

(58) Field of Classification Search
CPC .... H04W 88/06; H04B 1/0057; H04B 1/406

USPC .................................... 455/73, 41.2, 552.1
See application file for complete search history.

(56) References Cited

U.S. PATENT DOCUMENTS

| | | | |
|---|---|---|---|
| 2011/0032875 A1* | 2/2011 | Erceg ................... | H04B 7/0452 370/328 |
| 2012/0329395 A1* | 12/2012 | Husted et al. ............... | 455/41.2 |
| 2012/0329515 A1* | 12/2012 | Husted et al. ............. | 455/552.1 |
| 2013/0148636 A1* | 6/2013 | Lum .................... | H04B 1/0064 370/336 |
| 2013/0163450 A1* | 6/2013 | Kreuchauf .......... | H04W 76/045 370/252 |
| 2013/0272260 A1* | 10/2013 | Bitran ................... | H04W 16/14 370/329 |
| 2013/0331137 A1* | 12/2013 | Burchill et al. .............. | 455/501 |
| 2014/0273884 A1* | 9/2014 | Mantravadi ............. | H04B 1/38 455/73 |

FOREIGN PATENT DOCUMENTS

WO     WO 2012093349 A2 *  7/2012

* cited by examiner

*Primary Examiner* — Redentor Pasia
*Assistant Examiner* — Peter Mak
(74) *Attorney, Agent, or Firm* — Garlick & Markison; Randy W. Lacasse (57) ABSTRACT

A system and method for sharing antennas of a wireless communication device is provided. The wireless communication device leverages cellular antennas to improve data throughput by creating a multiple-in, multiple out (MIMO) operation for a wireless local area network (WLAN) connection. Antenna resources are dynamically allocated between the cellular antennas and the wireless antenna to provide improved throughput.

15 Claims, 10 Drawing Sheets

WLAN AND CELLULAR SHARED ANTENNAS

CROSS REFERENCE TO RELATED PATENTS/PATENT APPLICATIONS

The present U.S. Utility Patent Application claims priority pursuant to 35 U.S.C. §119(e) to the following U.S. Provisional Patent Application Ser. No. 61/860,635, entitled "WLAN and Cellular Shared Antennas," filed Jul. 31, 2013, which is hereby incorporated herein by reference in its entirety and made part of the present U.S. Utility Patent Application for all purposes.

BACKGROUND

1. Technical Field

The present disclosure described herein relates generally to wireless communications and more particularly to sharing antennas in a wireless communication device.

2. Description of Related Art

Communication systems are known to support wireless and wire line communications between wireless and/or wire line communication devices. The communication systems range from national and/or international mobile/handheld systems to the point-to-point gaming, in-home wireless networks, audio, video wireless devices. Communication systems typically operate in accordance with one or more communication standards. Wireless communication systems operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, and other equivalents communicate directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

DETAILED DESCRIPTION

Figure 1:
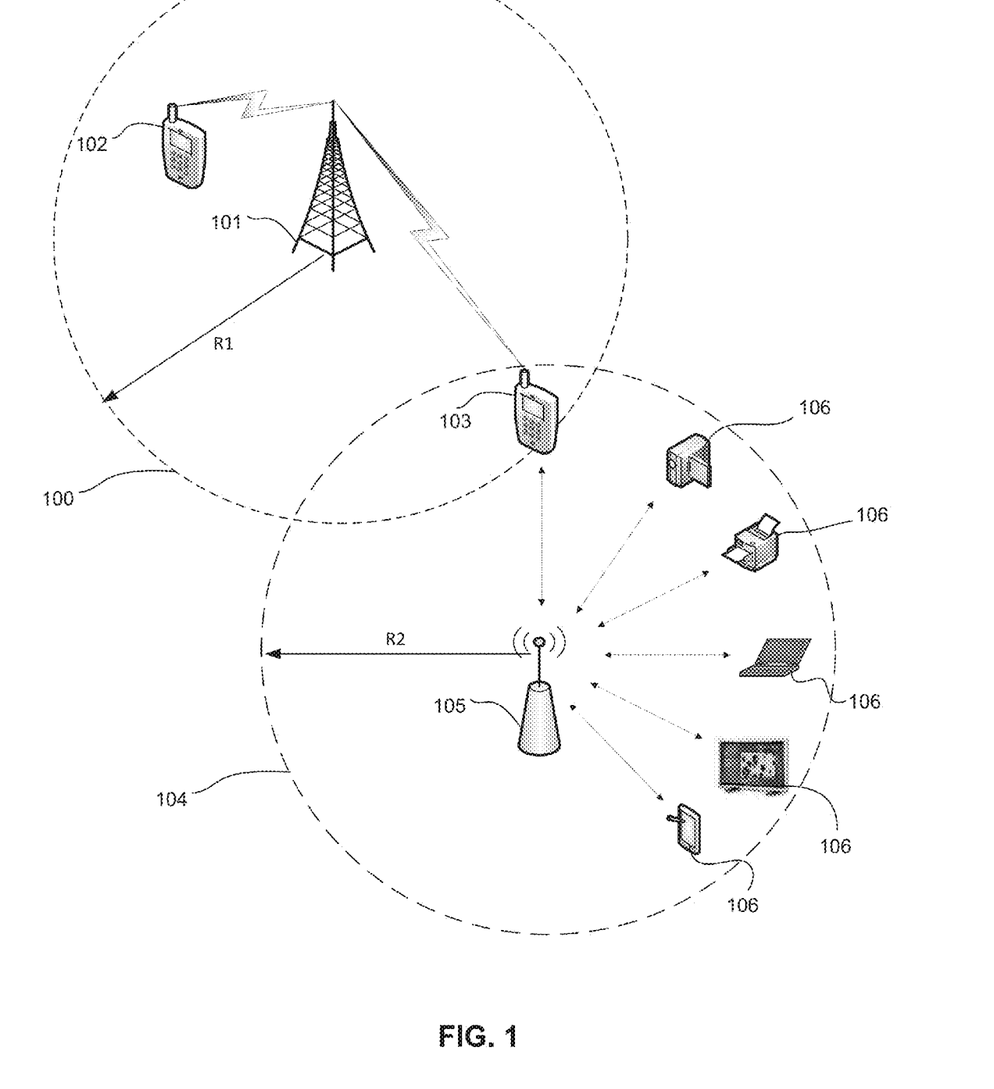
FIG. 1 illustrates an example embodiment of a communication cell structure proximate to a wireless local area network (WLAN) in accordance with the present disclosure.

FIG. 1 illustrates an example embodiment of a cellular network cell structure proximate to a wireless local area network (WLAN) in accordance with the present disclosure. A cellular network or mobile network is a radio network distributed over land areas called cells, each served by at least one fixed-location transceiver. In a cellular network, each cell uses a different set of radio frequencies (RF) from neighboring cells, to avoid interference and provide guaranteed bandwidth within each cell. A WLAN links wireless devices using a wireless distribution method (typically spread-spectrum or OFDM radio), and usually provides a connection through an access point to the wider Internet using, for example, IEEE 802.11 standards, such as Wi-Fi. Both the cell structure and WLAN include a geographic area for reception/transmission of wireless signals (RF) by one or more mobile communication devices. Mobile communication devices include, but are not limited to, mobile phones, smartphones, tablets, etc. As shown, cell 100 encapsulates a general reception/transmission area extending radially (R1) from cell tower 101. Various mobile communication devices, known as user equipment (UE), 102 and 103 transmit and receive signals to/from cell tower 101. Cell tower 101 typically includes a cell node (eNB) with base station connection to a cellular operator's network and eventual connection to a telephone network (not shown). The base station includes at least a transceiver (transmitter (TX) and receiver (RX)) and processing module.

WLAN 104 encapsulates a general reception/transmission area extending radially (R2) from access point (AP) 105. Various mobile communication devices such as UE 103 and other devices 106 (e.g., cameras, printers, laptops, TVs, tablets, etc.) will be connected through transmission and reception of wireless signals to/from AP 105, which typically would include an additional connection to, for example, the Internet. Although illustrated as a structured WLAN (i.e., with an access point (105)), the WLAN, can in one or more embodiments, be formed as an adhoc peer-to-peer (P2P) network with one UE (e.g., 103/106) in the WLAN acting as a group owner (GO)) and performing connection and networking functions of devices within the group. FIGS. 2-9 and their corresponding descriptions include embodiments where UE 103 can connect to both the communication cell structure (i.e., base station) and WLAN using a plurality of antennas located within the UE.

Figure 2:
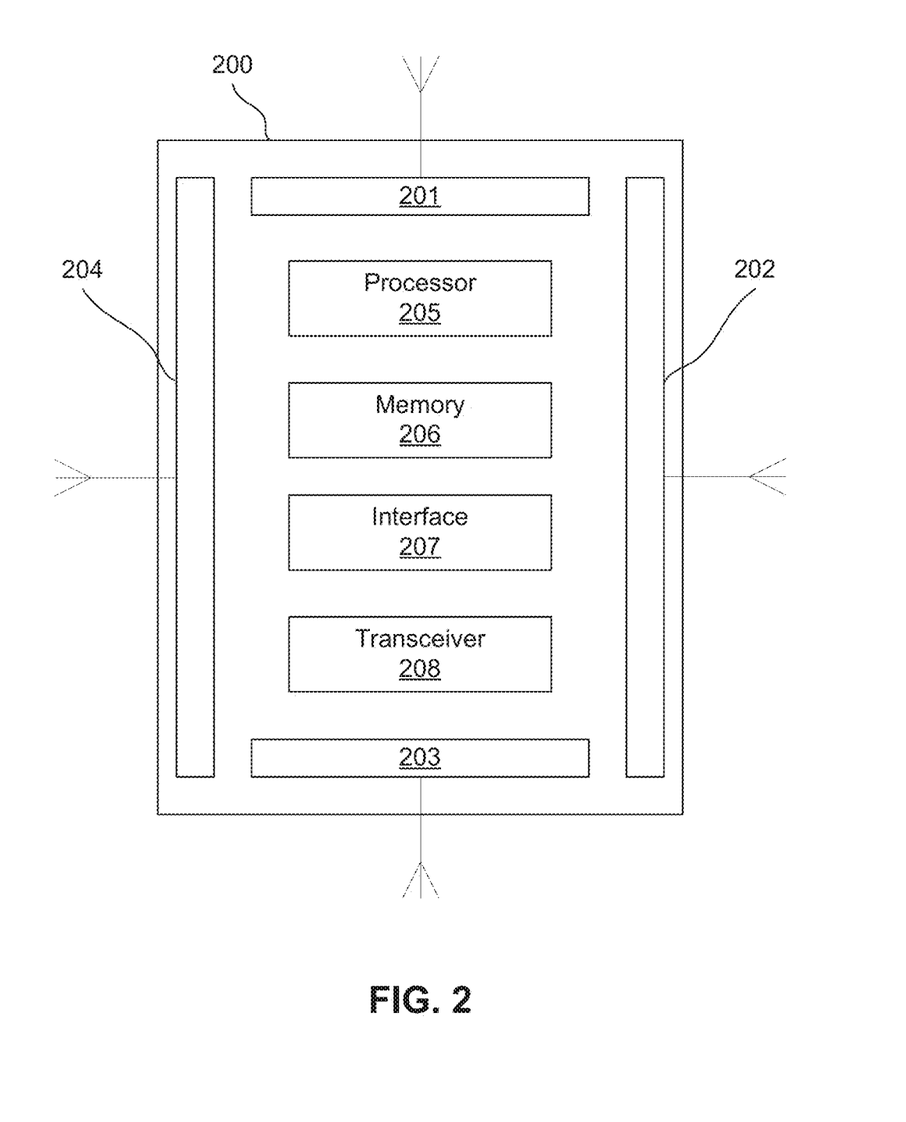
FIG. 2 illustrates a schematic block diagram of cellular communications circuitry for a mobile communications device in accordance with the present disclosure.

FIG. 2 illustrates a schematic block diagram of cellular communications circuitry for a mobile communications device (e.g., UE 103) in accordance with the present disclosure. Cellular capable wireless communications devices (e.g., UEs) are typically constructed with multiple antennas that support various communications protocols. In one embodiment, mobile communications device 200 includes: cellular antenna 201 (e.g., 3G, 4G, LTE, etc.), accessory antenna 202, diversity antenna 203 and multi-use WLAN/Bluetooth (BT) antenna 204. In one or more embodiments, accessory antennas include, but are not limited to, Global Positioning System (GPS), Near Field Communications (NFC) and other short-range communication protocol antennas.

Mobile communications device 200 also includes processor module 205 to process both communication and non-communication functions of the mobile communications device (e.g., antenna allocation). In addition, communication and non-communication data is stored in memory 206. Interface 207, in conjunction with processor module 205, includes processing of visual and non-visual external and internal data. Wireless communications device 200 also includes one or more transceiver modules (transmitter and receiver) 208 each with one or more radio signal processing chains (i.e., sequence of connected transmitter/receiver components (amplifiers, filters, mixers, converters, etc.)) as is known in the art of mobile communications devices.

As mobile communication devices evolve, new features, functions and capacities place a premium on internal space. For example, including MIMO (multiple-input multiple-output) communication structures requires including multiple antenna elements spaced apart (e.g., approximately 1-4 wavelengths or 15 dB of isolation). MIMO communications use multiple antennas to transmit and receive communications signals to improve communication performance. It does this by spreading the same total transmit power over the antennas to achieve an array gain that improves the spectral efficiency (more bits per second per hertz of bandwidth) and/or to achieve a diversity gain that improves the link reliability (reduced fading).

Figure 3:
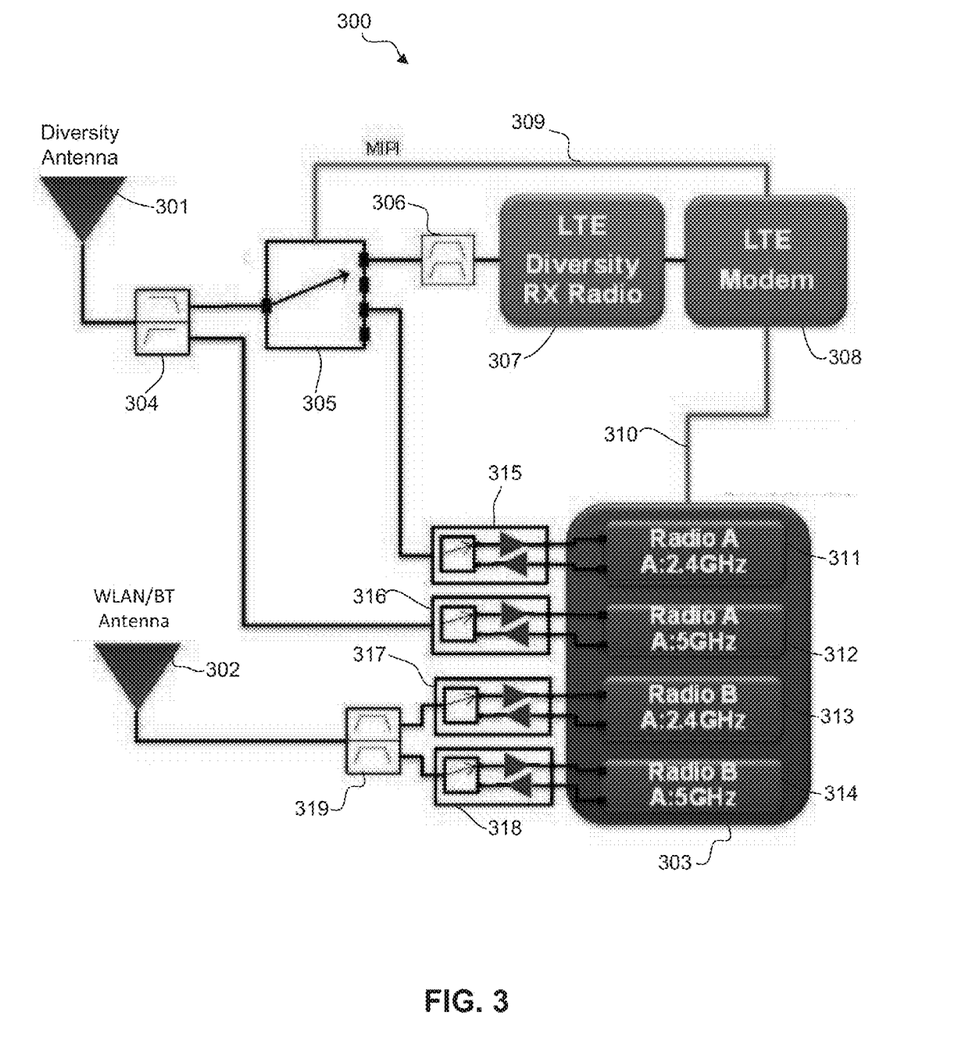
FIG. 3 illustrates one embodiment of cellular communications circuitry for a mobile communications device in accordance with the present disclosure.

FIG. 3 illustrates one embodiment of cellular communications circuitry for a mobile communications device in accordance with the present disclosure. As previously discussed, MIMO communications include use of two or more antennas. In addition, each antenna is connected to one or more communication signal processing chains to prepare a communications signal to be transmitted at a selected frequency or to process a received communications signal at the selected frequency. In this embodiment, mobile communications device 300 implements WLAN MIMO operation by pairing WLAN/Bluetooth antenna 302 with an idle diversity antenna 301 (e.g., LTE diversity antenna when not being used by LTE). To be paired, the diversity antenna 301 is selectively coupled to the LTE diversity circuitry (307/308) and WLAN MIMO radio circuitry 303 as will be described in greater detail hereafter.

WLAN MIMO radio circuitry 303 includes at least two radio processing chains (four shown) with each processing chain processing transmission/reception communications signals for each antenna at a selected frequency band. In an example embodiment, WLAN MIMO radio circuitry 303 includes 2.4 GHz MIMO transmission/reception capability using 2.4 GHz A and B radio processing chains and 5.0 GHz MIMO transmission/reception capability using 5.0 GHz A and B radio processing chains. Radio processing chains A are used for processing transmission/reception communication signals associated with diversity antenna 301. Radio processing chains B are used for processing transmission/reception communication signals associated with WLAN/BT antenna 302.

For ease of description, the received communication signals and associated path, starting with the antennas, will be described for each of the embodiments. Communication signals to be transmitted will generally follow a reverse path (some switches, as shown, will provide separate transmit/receive paths in opposite directions). Diplexer 304 (e.g., 5 GHz) separates/combines communication signals received/transmitted by diversity antenna 301 by filtering the signal into selected (distinguished) operational frequency bands (e.g., 2.4/5 GHz). A diplexer is a reversible passive device that implements frequency domain multiplexing/demultiplexing. As shown, received communication signals output from diplexer 304 follow two paths. A first path includes processing of the example 2.4 GHz communications signals and a second path includes processing of the example 5.0 GHz communications signals received by diversity antenna 301. Diversity switch 305 controls the 2.4 GHz signal flow to/from diversity antenna 301 and is connected through a first port to radio A 311 (e.g., 2.4 GHz) of WLAN MIMO radio circuitry 303 via bidirectional switch 315 (with amplification).

The second path includes processing of the example 5.0 GHz communications signals received by diversity antenna 301 through bidirectional switch 316 (with amplification). Diversity switch 305 is also connected through a second port and 2.4 GHz duplexer 306 to LTE diversity RX radio 307 and LTE Modem (modulator/demodulator) 308. A duplexer is a device that allows bi-directional (duplex) communication over a single path. It isolates the receiver from the transmitter while permitting them to share a common antenna. Connection 309 is a mobile industry process interface (MIPI) used to control diversity switch 305 based on activity of LTE modem 308 (i.e., LTE modem active=switched to LTE diversity processing path with elements 306/307/308; LTE modem inactive=switched to path with Radio A. LTE modem 308 is connected to the WLAN MIMO radio circuitry 303 by low latency coexistence (COEX) interface 310. Low latency coexistence interface 310 provides WLAN MIMO radio circuitry 303 with information on current use of LTE diversity antenna 301 by the LTE circuitry 307/308 and control of diversity switch 305 (through MIPI 309), thus eliminating a switch from the 2.4 GHz signal path. WLAN/Bluetooth antenna 302 is connected to B radios (e.g., 2.4 GHz and 5 GHz) 313 and 314 in WLAN MIMO radio circuitry 303 through bidirectional switches 317 and 318 (with amplification) and diplexer 319.

In one embodiment, low latency coexistence interface 310 enables the pairing of the WLAN and diversity antennas by informing WLAN MIMO radio circuitry 303 when diversity antenna 301 is not in use by the LTE circuitry. In another embodiment, low latency coexistence interface 310 gives future knowledge of when the diversity antenna will be available for sharing. In other embodiments, timers, for example, RRC (radio resource control) inactivity timers are used to keep the WLAN MIMO radio circuitry notified of non-use (idle) of the diversity antenna. The RRC idle mode means there is no connection by one or more of the cellular radios and therefore at least one of the cellular antennas are available for use by the WLAN for MIMO mode.

In one or more embodiments, if either of the cellular antennas (e.g., LTE and LTE diversity antennas) are operating with the WLAN antenna for MIMO operation and a mobile cellular call is received, priority is given to the mobile cellular call and the WLAN MIMO operation is switched to a single-input, single-output (SISO) WLAN operation (i.e., only Radio B operational) so as to make the LTE diversity antenna available for the mobile call. In one or more embodiments, a power control message (e.g., power saving mode) is used to switch from MIMO to SISO. Upon the mobile cellular call completion, WLAN MIMO operations can be resumed.

Figure 4:
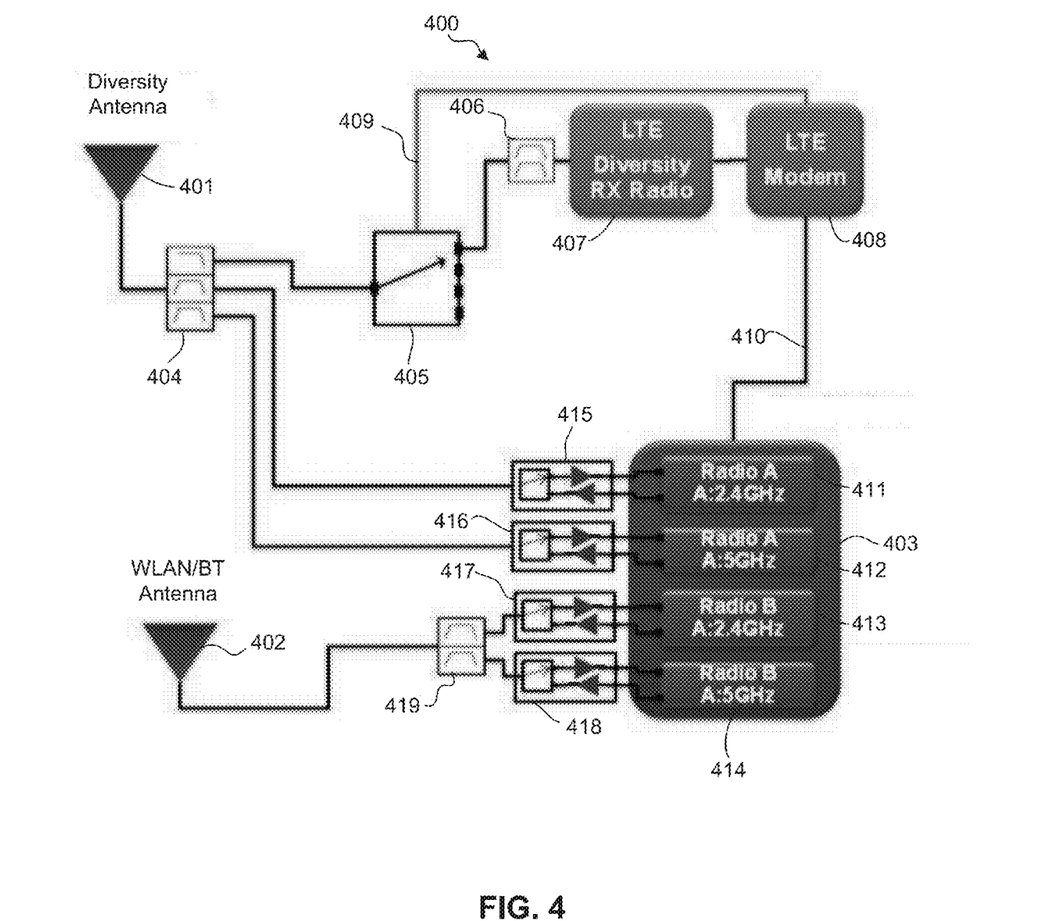
FIG. 4 illustrates another embodiment of cellular communications circuitry for a mobile communications device in accordance with the present disclosure.

FIG. 4 illustrates another embodiment of cellular communications circuitry for a mobile communications device in accordance with the present disclosure. Mobile communications device 400 provides for WLAN MIMO operation by paring diversity antenna (e.g., LTE) 401 with WLAN/Bluetooth antenna 402. As shown, diversity antenna 401 is connected to triplexer 404 for separating/combining communication signals by signal frequency multiplexing (shown with one low-pass filter and two band pass filters). LTE signals are communicated from triplexer 404 to diversity switch 405 and connected to LTE modem 408 through duplexer 406 and LTE diversity RX radio 407. Non-LTE signals (e.g., 2.4/5.0 GHz for the WLAN) are communicated by triplexer 404 to WLAN MIMO radio circuitry 403 through bidirectional switches (with amplification) 415 and 416 to respective A radios (e.g., 2.4 GHz radio 411 and 5 GHz radio 412). COEX interface 410 connects LTE modem 408 to WLAN MIMO radio circuitry 403. WLAN/Bluetooth (BT) antenna 402 is connected to either radio B (e.g., 2.4 GHz) 413 or Radio B (e.g., 5.0 GHz) 414 of WLAN MIMO radio circuitry 403 through diplexer 419 and bidirectional switches 417 and 418. Signals are multiplexed by diplexer 419 to bidirectional switch 417 and bidirectional switch 418 to 2.4 GHz radio 413 and 5 GHz radio 414, respectively. Connection 409 is a mobile industry process interface (MIPI) used to control diversity switch 405 based on activity of LTE modem 408 (i.e., LTE active=switched to LTE diversity processing path with elements 406/407/408; LTE inactive=disconnected).

In operation, when mobile communications device 400 is communicating with LTE communications with diversity, LTE signals are received on diversity antenna 401, filtered and forwarded through diversity switch 405 to be processed by the LTE diversity RX radio and LTE modem. When WLAN MIMO is desired, and the diversity antenna is available (i.e., not in use by LTE diversity processing circuitry (407/408)), 2.4 GHz communication signals are received/transmitted by A and B radios (2.4 GHz) and 5.0 GHz communication signals are transmitted/received by A and B radios (5.0 GHz). Bidirectional switches (415-418) control the direction and amplification communication signals.

Figure 5:
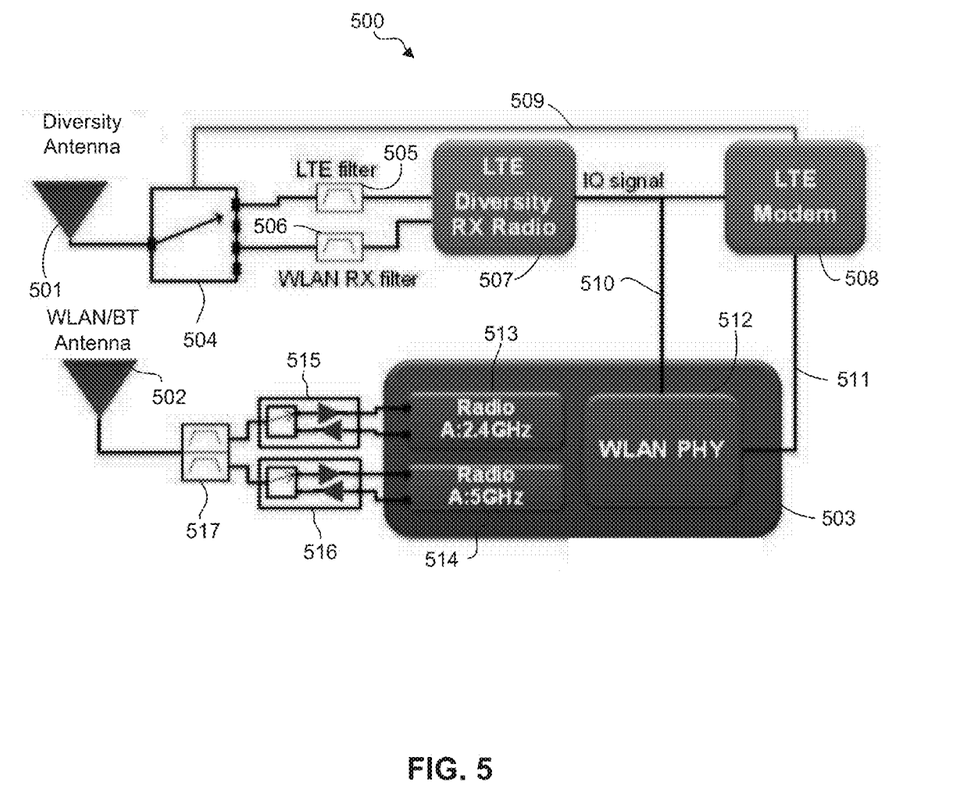
FIG. 5 illustrates another embodiment of cellular communications circuitry for a mobile communications device in accordance with the present disclosure.

FIG. 5 illustrates another embodiment of cellular communications circuitry for a mobile communications device in accordance with the present disclosure. Mobile communications device 500 provides WLAN MIMO for the receiver (RX) side by pairing diversity antenna (e.g., LTE) 501 and WLAN/Bluetooth antenna 502. As shown diversity antenna 501 is connected to diversity switch 504. Diversity switch 504 is connected through a first port to LTE bandpass filter 505 and through a second port to WLAN RX bandpass filter 506. Both LTE bandpass filter 505 and WLAN RX bandpass filter 506 are coupled to LTE diversity RX radio 507 for processing either LTE or WLAN RX communication signals and are further connected to LTE modem 508. WLAN/Bluetooth antenna 502 is connected to diplexer 517 to bidirectional switches (with amplification) 515 and 516. Bidirectional switches 515 and 516 are connected to WLAN MIMO radio circuitry 503 including connections to 2.4 GHz radio 513 and 5 GHz radio 514, respectively. WLAN PHY (physical layer) 512 integrates parallel signal received communication signal streams from diversity antenna 501 and WLAN/Bluetooth antenna 502 to improve sensitivity and is connected through connection 510. Connection 509 is a mobile industry process interface (MIPI) used to control diversity switch 504 based on activity (as monitored on COEX interface 511) of LTE modem 508 (i.e., LTE active=switched to LTE diversity processing path with elements 505/507/508; LTE inactive=WLAN RX path with elements 506/507/512).

In operation, this configuration provides for the sharing of LTE radio frequency (RF) circuitry. Instead of implementing a duplicate receiver within the WLAN MIMO radio circuitry 503, LTE diversity RX radio 507 receives the 2.4 GHz WLAN signal and then, when available, the WLAN PHY takes the output of the LTE receiver 507 for WLAN MIMO RX operation. In this embodiment, WLAN MIMO 5.0 GHz is not provided. SISO 5.0 $GH_z$ TX/RX communications are transmitted/received through antenna 502.

Figure 6:
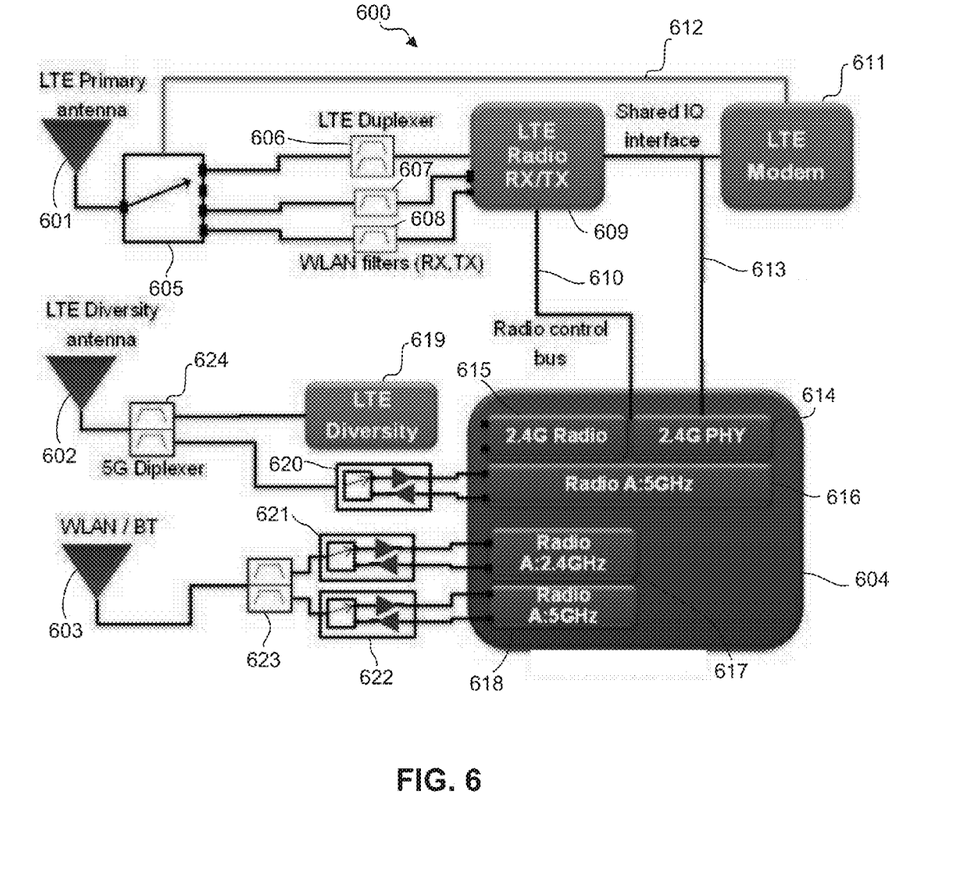
FIG. 6 illustrates another embodiment of cellular communications circuitry for a mobile communications device in accordance with the present disclosure.

FIG. 6 illustrates another embodiment of cellular communications circuitry for a mobile communications device in accordance with the present disclosure. Mobile communications device 600 provides for sharing reception (RX) and transmission (TX) paths of the LTE primary communications path for WLAN MIMO 2.4 GHz. In this embodiment, WLAN operates in WLAN MIMO mode with up to three antennas. For example, all 3 antennas (e.g., LTE Primary, LTE diversity and WLAN/Bluetooth antennas) are used for WLAN MIMO, or 2 of the 3 antennas are used for diversity in a 2×2 MIMO. With this sharing configuration, it allows the MIMO device to search more quickly for communication signals with 2 receivers searching for a signal in the band. For example, WLAN MIMO uses the second receiver 615 to look for clear frequency bands dynamically.

Referring to FIG. 6, LTE primary antenna 601 is connected to LTE multi-port switch 605 having a first port connected to LTE duplexer 606, second and third ports connected to WLAN RX bandpass filter 607 and WLAN TX bandpass filter 608, respectively. LTE duplexer 606, WLAN RX bandpass filter 607 and WLAN TX bandpass filter 608 are all connected to LTE radio RX/TX 609 and LTE modem 611. LTE diversity antenna 602 is connected to 5G diplexer 624 having a connection to LTE diversity radio 619 (to provide LTE diversity) and a connection to switch 620 connected to Radio A (5 GHz) 616. WLAN MIMO radio circuitry 604 is connected to the LTE Radio RX/TX 609 through radio control bus 610 and WLAN/LTE COEX+ Radio Control bus 613. Connection 612 is a mobile industry process interface (MIPI) used to control LTE multi-port switch 605 based on activity (as monitored on bus 613). Activity includes: LTE active=switched to LTE processing path with elements 606/609/611, LTE inactive=for WLAN MIMO receiving—WLAN RX path with elements 607/609/614/615 and for WLAN MIMO transmitting—WLAN TX path with elements 608/609/614/615. WLAN/Bluetooth antenna 603 is connected to diplexer 623 and separated into 2.4 GHz or 5.0 GHz signal processing chains through bidirectional switches 621 and 622 (with amplification) to include, for example, Radio A (2.4 GHz) 617 and Radio B (5.0 GHz) 618. In an alternative embodiment, Radio A (2.4 GHz) 617 receives/transmits with LTE Primary antenna 601 in a manner similar to 2.4 GHz radio 615. In one embodiment, the WLAN PHY (e.g., 2.4 GHz) outputs a baseband signal for TX.

Figure 7:
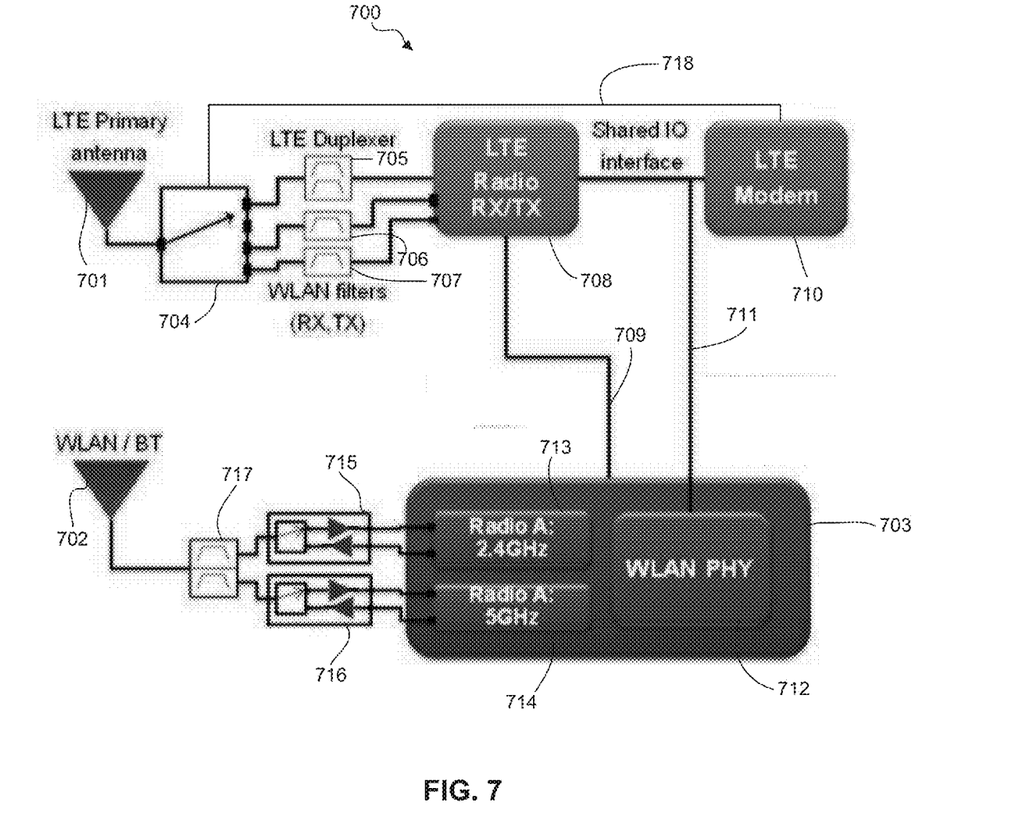
FIG. 7 illustrates another embodiment of cellular communications circuitry for a mobile communications device in accordance with the present disclosure.

FIG. 7 illustrates another embodiment of cellular communications circuitry for a mobile communications device in accordance with the present disclosure. Mobile communications device 700 provides for 2.4 GHz WLAN MIMO communications by sharing LTE primary antenna and LTE circuitry during non-use. As shown, LTE primary antenna 701 is coupled to LTE switch 704 having a first port connected to LTE duplexer 705, second and third ports connected to WLAN RX bandpass filter 706 and WLAN TX bandpass filter 707, respectively. LTE duplexer 705, WLAN RX bandpass filter 706 and WLAN TX bandpass filter 707 are all connected to LTE radio RX/TX 708 and subsequently coupled to LTE modem 710. WLAN/Bluetooth antenna 702 is connected to 2.4 GHz radio A 713 and 5 GHz radio B 714 of WLAN MIMO circuitry 703 through duplexer 717 and bidirectional switches (with amplification) 715 and 716, respectively.

WLAN MIMO radio circuitry 703 is connected to the LTE Radio RX/TX 708 through radio control bus 709 and WLAN/LTE COEX+Radio Control bus 711. Connection 718 is a mobile industry process interface (MIPI) used to control LTE multi-port switch 704 based on activity (as monitored on bus 711). Activity includes: LTE active=switched to LTE processing path with elements 705/708/710, LTE inactive=for WLAN MIMO 2.4 GHz receiving—WLAN RX path with elements 706/708/712 and for WLAN MIMO 2.4 GHz transmitting—WLAN TX path with elements 707/708/712. In this embodiment, WLAN MIMO 5.0 GHz is not provided. SISO 5.0 GHZ TX/RX communications are transmitted/received through antenna 702.

Figure 8:
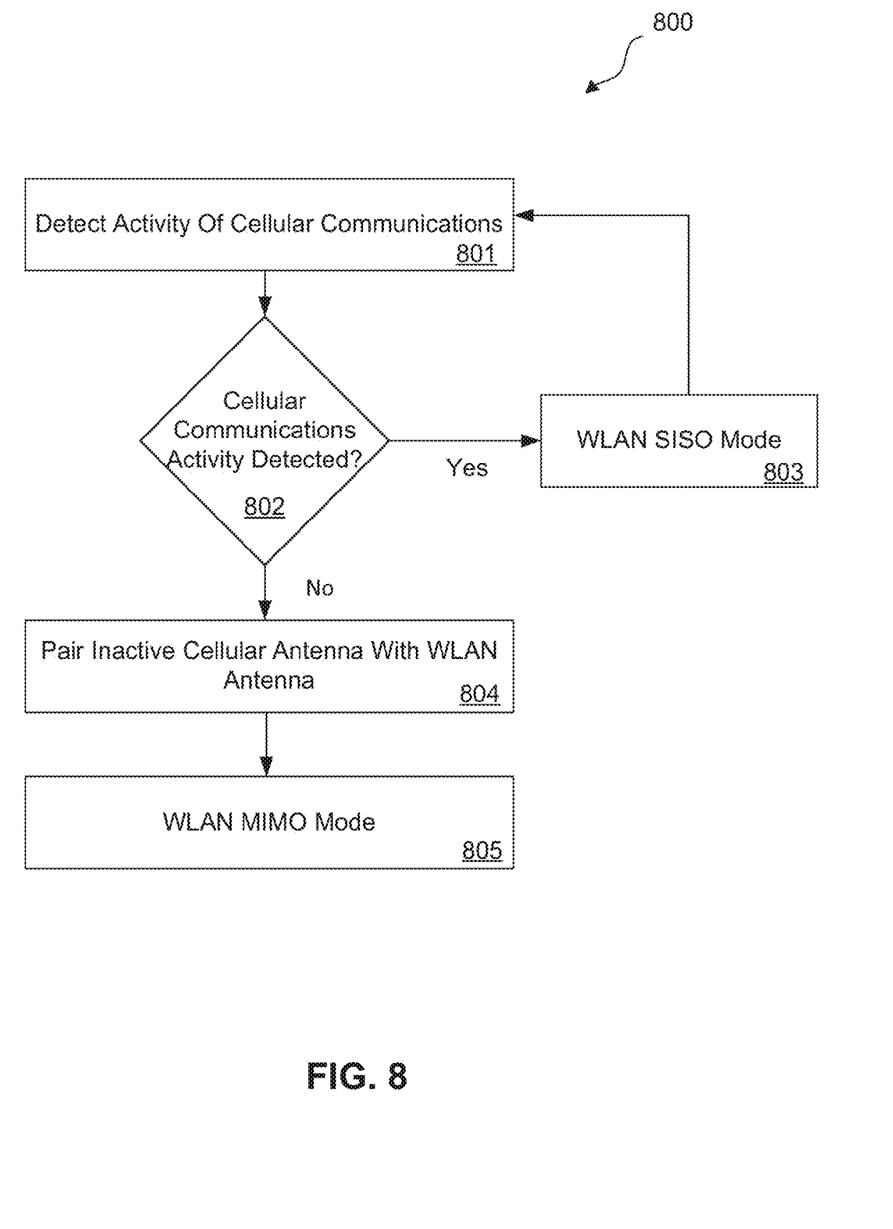
FIG. 8 illustrates a flow diagram of one example embodiment performed on cellular communications circuitry for a mobile communications device in accordance with the present disclosure.

FIG. 8 illustrates a flow diagram of one example embodiment performed on cellular communications circuitry of a mobile communications device in accordance with the present disclosure. As shown, flow diagram 800 supports WLAN MIMO operation on a mobile communications device. In step 801, activity of cellular communications circuitry (e.g., LTE radio and/or LTE modem) is monitored. In step 802, if the cellular communications circuitry is actively using the cellular antennas, then WLAN communication circuitry is operated in WLAN SISO mode (step 803). In step 804, if the cellular communications circuitry is not actively using one or more of the cellular antennas, then the WLAN communication circuitry uses (pairs) the inactive cellular antenna (e.g., the diversity antenna and/or the primary antenna) and, in step 805, the WLAN circuitry is operated in WLAN MIMO mode.

As previously described, the embodiments of the present disclosure include monitoring of activity of LTE communications (inactive, active and partially active duty cycles). Monitoring the activity of LTE communications allows LTE antenna sharing in any of: idle mode (LTE not active), discontinuous reception (DRX) mode (similar to sleep mode), micro-sleep and secondary component carrier not active mode (e.g., allows using inter-band Carrier Aggregation (CA)). For example, in idle mode, LTE requires access to over the air data (both receiving (RX) antennas) for up to every 320 milliseconds (ms), and will keep it for up to 40 ms continuously (in practice, the period can be up to 2560 ms). The duty cycle for LTE is predictable and therefore is timely communicated over the COEX interface to the WLAN MIMO device to implement antenna sharing.

Figure 9:
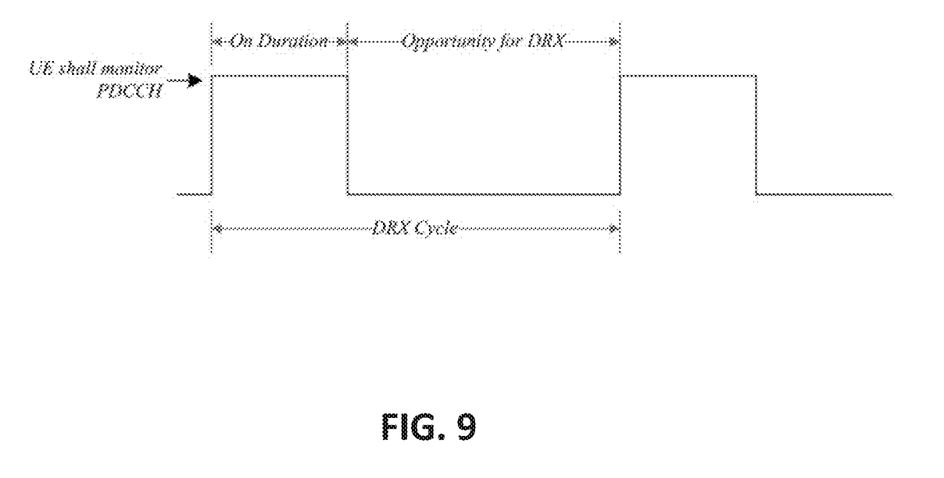
FIG. 9 illustrates a DRX cycle in accordance with the present disclosure.

In one embodiment, in LTE discontinuous reception (DRX) mode (reduced active duty cycles), the duty cycle for using the diversity antenna by LTE is less predictable. For example, LTE only knows a few ms before whether it will be available for sharing or not. FIG. 9 illustrates a DRX cycle in accordance with the present disclosure. As shown, the mobile communications device (e.g., UE) monitors the Physical Downlink Control Channel (PDCCH) during the ON ("Active time"—time when PDCCH needs to be monitored), but opportunities for DRX (i.e., LTE sleep or idle) represent opportunities for antenna sharing. If DRX is configured in RRC_Connected, UE is allowed to monitor the PDCCH discontinuously, otherwise UE monitors the PDCCH on continuous sub-frame basis. Regardless of whether UE is monitoring PDCCH or not, the LTE standard requires UE to be ready to receive and transmit HARQ feedback when such is expected, receive UL grant for a pending HARQ re-transmission and receive pre-configured PDCCH (semi-persistent scheduling, SPS).

Figure 10:
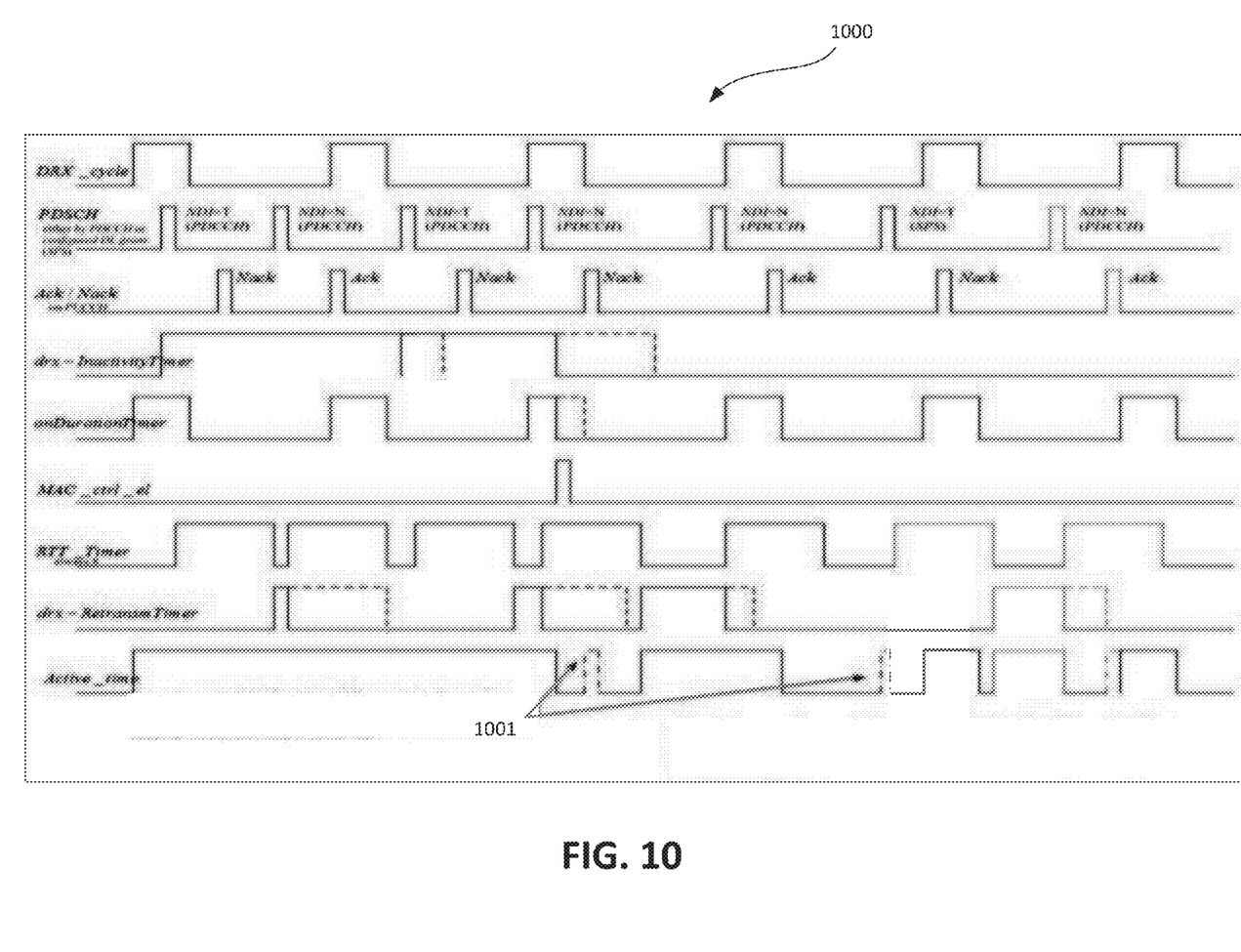
FIG. 10 illustrates a state machine for active time and awake states in accordance with the present disclosure.

FIG. 10 illustrates a state machine for active time and awake states in accordance with the present disclosure. As shown, state machine 1000 illustrates various signals used in one or more embodiments to monitor LTE modem activity to determine opportunities for WLAN MIMO antenna sharing. Signals 1001 do not represent active time from DRX perspective, as PDCCH is not being monitored, but modem will be awake for sending Physical Uplink Control Channel (PUCCH) or to receive DL assignment for SPS.

In an alternative embodiment, LTE operates in micro-sleep mode and decodes the downlink control channel and powers down the transmission if no allocations are available in the current subframe. Micro-sleep provides sub-ms resolution where antenna allocation occurs within, for example, within 0.5 ms. For LTE with inter-band carrier aggregation (CA), the WLAN uses a second feed on an RX antenna when secondary component carrier (SCC) is not configured or activated for LTE. LTE has more than 8 ms to activate SCC after receiving an activation message.

In one embodiment, in LTE TDD, WLAN shares a second antenna during LTE UL in normal connected mode of LTE. The existing framework defined in the LTE standard for WLAN/LTE interference avoidance can be adopted to efficiently exploit LTE TDD TX subframes for WLAN DL MIMO reception.

As previously described, in one or more embodiments, the LTE diversity antenna is shared for a WLAN MIMO operation when the LTE diversity antenna is not being used. In another embodiment, priority is given to the LTE antenna and LTE diversity antenna for mobile communications. For example, if the LTE diversity antenna is operating with the WLAN antenna for MIMO operation and a mobile call is received, precedence is given to the mobile call and the WLAN MIMO operation is switched to a single-in, single-out (SISO) WLAN operation so as to make the LTE antenna available for the mobile call.

In one or more embodiments, antennas provided in the mobile communications device will not have omni-directional performance. Under these circumstances, WLAN chooses between the multiple antennas when cellular communications are inactive. For the Wi-Fi offload of LTE, the transition can contribute to the antenna selection between the LTE antenna and WLAN/Bluetooth antenna. The network would provide the information to the mobile communications device to switch priority from the LTE antenna to WLAN/Bluetooth antenna.

In alternative embodiments of the technology described herein, mobile communications device have been described with respect to sharing LTE and LTE diversity antennas for mobile communications; however, other networks (non-LTE) and associated antennas are also anticipated including: 2G, 3G, 4G and future mobile communications networks. In addition, while described throughout use with WLAN communication signals, the WLAN/BT antenna can adapt the same embodiments to provide a second antenna for Bluetooth operations to aid in direction finding or antenna diversity without departing from the scope of the technology described herein. And further, the embodiments in accordance with the present disclosure can be adapted to provide reuse of antennas for any present or future communications signal type.

Embodiments of the technology described herein provide for additional antenna functionality without the added cost of designing/implementing them. Given the decreasing size of antennas in cellular phones, adding additional antennas is getting more and more difficult. The addition of sharing antennas effectively provides for several advantages including: diversity by choosing an antenna which has the best link budget (typically 3 dB+), decreased power consumption, increased data throughput, simultaneous dual antenna (MIMO) operation, improvements in signal-to-noise ratios (SNR) through combining signals, beam forming for improving antenna gain/rejection of other signals, coexistence, use of two antennas when one was previously required (e.g., Bluetooth and WLAN could have their own antennas, thereby improving the WLAN and Bluetooth throughput). While the embodiments described herein illustrate 2-4 antennas, the teachings can be adapted to any larger number of available antennas In one or more embodiments the technology described herein the wireless connection can communicate in accordance with a wireless network protocol such as Wi-Fi, WiHD, NGMS, IEEE 802.11a, ac, b, g, n, or other 802.11 standard protocol, Bluetooth, Ultra-Wideband (UWB), WIMAX, or other wireless network protocol, a wireless telephony data/voice protocol such as Global System for Mobile Communications (GSM), General Packet Radio Service (GPRS), Enhanced Data Rates for Global Evolution (EDGE), Personal Communication Services (PCS), or other mobile wireless protocol or other wireless communication protocol, either standard or proprietary. Further, the wireless communication path can include separate transmit and receive paths that use separate carrier frequencies and/or separate frequency channels. Alternatively, a single frequency or frequency channel can be used to bi-directionally communicate data to and from the mobile communications device.

In addition, while shown using a mobile industry process interface (MIPI) to control diversity switches, other known or future control interfaces can be substituted without departing from the scope of the technology disclosed herein.

Throughout the specification, drawings and claims various terminology is used to describe the various embodiments. As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, wavelengths, distance between antennas and circuit variations. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship.

In an embodiment of the technology described herein, receiver and transmitter processing modules are implemented via use of a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. In some embodiments, the associated memory is a single memory device or a plurality of memory devices that are either on-chip or off-chip. Such a memory device includes a read-only memory, random access memory, volatile memory, non-volatile memory, static memory, dynamic memory, flash memory, and/or any device that stores digital information. Note that when the processing devices implement one or more of their functions via a state machine, analog circuitry, digital circuitry, and/or logic circuitry, the associated memory storing the corresponding operational instructions for this circuitry is embedded with the circuitry comprising the state machine, analog circuitry, digital circuitry, and/or logic circuitry.

As may also be used herein, the terms "processor", "processor module", "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The technology as described herein has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed technology described herein. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed technology described herein. One of average skill in the art will also recognize that the functional building blocks, and other illustrative blocks, modules and components herein, can be implemented as illustrated or by discrete components, application specific integrated circuits, processors executing appropriate software and the like or any combination thereof.

The technology as described herein may have also been described, at least in part, in terms of one or more embodiments. An embodiment of the technology as described herein is used herein to illustrate an aspect thereof, a feature thereof, a concept thereof, and/or an example thereof. A physical embodiment of an apparatus, an article of manufacture, a machine, and/or of a process that embodies the technology described herein may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

While particular combinations of various functions and features of the technology as described herein have been expressly described herein, other combinations of these features and functions are likewise possible. The technology as described herein is not limited by the particular examples disclosed herein and expressly incorporates these other combinations.

The invention claimed is:

1. A mobile communications device comprising:
a cellular diversity communications antenna;
a triplexer, coupled to the cellular diversity antenna, including a plurality of filters to distinguish WLAN and cellular communication signals transmitted/received on the cellular diversity communications antenna;
a long-term evolution (LTE) diversity switch coupled to the triplexer and cellular diversity communications antenna;
cellular communications circuitry selectively coupled through the long-term evolution (LTE) diversity switch to the cellular diversity communications antenna, the cellular communications circuitry determining cellular communications activity by monitoring any of: an active duty cycle, an idle duty cycle and a reduced duty cycle;
a first pair of first frequency and second frequency WLAN radio processing chains selectively coupled to the cellular diversity communications antenna;
a WLAN communications antenna;
a second pair of the first frequency and second frequency WLAN radio processing chains selectively coupled to the WLAN communications antenna;
a low-latency coexistence (COEX) interface to transfer information reflecting the activity of the cellular communications circuitry to at least the first pair of first frequency and second frequency WLAN radio processing chains;
a mobile industry process interface (MIPI) coupled to the LTE diversity switch to control the LTE diversity switch based on the determined cellular communications activity; and
wherein at least one from the first pair of the first frequency WLAN radio processing chains is selectively coupled to the cellular diversity communications antenna in a WLAN MIMO (wireless local area network multiple-input multiple-output) configuration when the cellular communications circuitry determined cellular communications activity is at least partially inactive.

2. The mobile communications device of claim 1, wherein the WLAN communications antenna comprises a WLAN/Bluetooth antenna.

3. The mobile communications device of claim 1, wherein when the cellular communications circuitry is at least partially inactive is determined by monitoring by activity/inactivity timers.

4. The mobile communications device of claim 1 further comprises predicting future opportunities for operating WLAN communications in the WLAN MIMO configuration.

5. The mobile communications device of claim 1 further comprising the cellular communications including long-term evolution (LTE) communications and the active duty cycle, idle duty cycle and reduced duty cycles are determined by monitoring any of: LTE idle mode, LTE discontinuous reception (DRX) mode, LTE micro-sleep and secondary component carrier (SCC).

6. The mobile communications device of claim 1 further comprising, when the cellular communications circuitry is not active, using the WLAN MIMO configuration for receiving WLAN communication signals and using a WLAN SISO configuration for transmitting WLAN communication signals.

7. The mobile communications device of claim 1, wherein the first frequency is 2.4 GHz and the second frequency is 5.0 GHz.

8. The mobile communications device of claim 1, wherein the plurality of filters separate incoming communication signals into cellular and WLAN communication signals.

9. The mobile communications device of claim 1, wherein the plurality of filters combine one or more outgoing cellular communication signals or WLAN communication signals.

10. The mobile communications device of claim 1, wherein the triplexer processes incoming and outgoing communication signals by frequency multiplexing.

11. The mobile communications device of claim 1, wherein the mobile industry process interface (MIPI) selectively bypasses a cellular communication signal processing chain within the cellular communications circuitry based on the cellular communications activity.

12. Communications circuitry comprising:
a cellular diversity communications antenna;
a triplexer, coupled to the cellular diversity antenna, including a plurality of filters to distinguish WLAN and cellular communication signals transmitted/received on the cellular diversity communications antenna;
a long-term evolution (LTE) diversity switch coupled to the triplexer and cellular diversity communications antenna;
cellular communications circuitry selectively coupled through the long-term evolution (LTE) diversity switch to the cellular diversity communications antenna, the cellular communications circuitry determining cellular communications activity by monitoring any of: an active duty cycle, an idle duty cycle and a reduced duty cycle;
a first pair of first frequency and second frequency WLAN radio processing chains selectively coupled to the cellular diversity communications antenna;
a WLAN communications antenna;
a second pair of the first frequency and second frequency WLAN radio processing chains selectively coupled to the WLAN communications antenna;
a low-latency coexistence (COEX) interface to transfer information reflecting the activity of the cellular communications circuitry to at least the first pair of first frequency and second frequency WLAN radio processing chains;
a mobile industry process interface (MIPI) coupled to the LTE diversity switch to control the LTE diversity switch based on the activity; and
wherein at least one from the first pair of the first frequency WLAN radio processing chains is selectively coupled to the cellular diversity communications antenna in a WLAN MIMO (wireless local area network multiple-input multiple-output) configuration when the cellular communications circuitry determined activity is at least partially inactive.

13. The communications circuitry of claim 12, wherein the mobile industry process interface (MIPI) selectively bypasses a cellular communication signal processing chain within the cellular communications circuitry based on the cellular communications activity.

14. An apparatus comprising:
a cellular diversity communications antenna;
a triplexer, coupled to the cellular diversity antenna, including a plurality of filters to distinguish WLAN and cellular communication signals transmitted/received on the cellular diversity communications antenna;
a long-term evolution (LTE) diversity switch coupled to the triplexer and cellular diversity communications antenna;
cellular communications circuitry selectively coupled through the long-term evolution (LTE) diversity switch to the cellular diversity communications antenna, the cellular communications circuitry determining cellular communications activity by monitoring any of: an active duty cycle, an idle duty cycle and a reduced duty cycle;
a first pair of first frequency and second frequency WLAN radio processing chains selectively coupled to the cellular diversity communications antenna;
a WLAN communications antenna;
a second pair of the first frequency and second frequency WLAN radio processing chains selectively coupled to the WLAN communications antenna;
a low-latency coexistence (COEX) interface to transfer information reflecting the activity of the cellular communications circuitry to at least the first pair of first frequency and second frequency WLAN radio processing chains;
a mobile industry process interface (MIPI) coupled to the LTE diversity switch to control the LTE diversity switch based on the activity; and
wherein at least one from the first pair of the first frequency WLAN radio processing chains is selectively coupled to the cellular diversity communications antenna in a WLAN MIMO (wireless local area network multiple-input multiple-output) configuration when the cellular communications circuitry determined cellular communications activity is at least partially inactive.

15. The apparatus of claim 14, wherein the mobile industry process interface (MIPI) selectively bypasses a cellular communication signal processing chain within the cellular communications circuitry based on the cellular communications activity.

* * * * *